(12) United States Patent
Yoo

(10) Patent No.: US 12,422,288 B2
(45) Date of Patent: *Sep. 23, 2025

(54) ULTRASONIC FLOW METER

(71) Applicant: IS TECHNOLOGIES CO., LTD., Incheon (KR)

(72) Inventor: Na Kyoung Yoo, Incheon (KR)

(73) Assignee: IS TECHNOLOGIES CO., LTD., Incheon (KR)

( * ) Notice: Subject to any disclaimer, the term of this patent is extended or adjusted under 35 U.S.C. 154(b) by 241 days.

This patent is subject to a terminal disclaimer.

(21) Appl. No.: 18/094,209

(22) Filed: Jan. 6, 2023

(65) Prior Publication Data

US 2023/0160731 A1    May 25, 2023

Related U.S. Application Data

(63) Continuation-in-part of application No. 17/684,606, filed on Mar. 2, 2022, now abandoned.

(30) Foreign Application Priority Data

Nov. 19, 2021    (KR) .......................... 1020210160607

(51) Int. Cl.
*G01F 1/66*    (2022.01)

(52) U.S. Cl.
CPC .................... *G01F 1/662* (2013.01)

(58) Field of Classification Search
CPC ...................................... G01F 1/662
USPC ...................................... 73/861.18
See application file for complete search history.

(56) References Cited

U.S. PATENT DOCUMENTS

2018/0306617 A1* 10/2018 Bonomi .................. G01F 1/662

FOREIGN PATENT DOCUMENTS

| CN | 210135957 U | * 3/2020 |
|----|-------------|----------|
| JP | 10274551 A  | 10/1998  |
| JP | 2015014568 A | 1/2015  |
| KR | 101576771 B1 | 12/2015 |
| WO | 2018174121 A1 | 9/2018 |

OTHER PUBLICATIONS

Translation of CN-210135957-U (Year: 2020).*

* cited by examiner

*Primary Examiner* — Nathaniel T Woodward
(74) *Attorney, Agent, or Firm* — Best & Flanagan LLP

(57) ABSTRACT

An ultrasonic flow meter, according to an embodiment of the present disclosure, comprises a measurement tube, an ultrasonic sensor module, and a pair of reflectors, wherein the measurement tube is configured to allow fluid to flow therethrough and comprises a pair of sensor holes spaced apart from each other in a longitudinal direction on an outer surface thereof, the ultrasonic sensor module comprises a pair of ultrasonic transducers mounted in the sensor holes, the ultrasonic transducers being configured to send and receive ultrasonic waves, and the pair of reflectors are located in the measurement tube, and wherein the measurement tube further comprises a flow path sectional area reduction member comprising a plurality of plates arranged such that a plurality of branch flow paths are formed in the longitudinal direction around a central flow path in between the pair of reflectors.

20 Claims, 14 Drawing Sheets

C - C

ULTRASONIC FLOW METER

CROSS-REFERENCE TO RELATED APPLICATION

This application is a continuation-in-part (CIP) of U.S. patent application Ser. No. 17/684,606, filed Mar. 2, 2022, which claims the benefit of Korean Patent Application No. P2021-0160607, filed on Nov. 19, 2021, each of which is hereby incorporated by reference as if fully set forth herein.

BACKGROUND OF THE DISCLOSURE

Field of the Present Disclosure

The present disclosure relates to an ultrasonic flow meter configured to measure the flow rate of a fluid (water or oil) using ultrasonic waves.

Discussion of the Related Art

A flow meter, which is configured to measure the flow rate of a fluid, is classified as a differential pressure flow meter using Bernoulli's theorem, an electromagnetic flow meter using Faraday's law, or an ultrasonic flow meter using a Doppler method and a time difference method.

Since an ultrasonic sensor is installed outside a pipe, it is easy to install and maintain the ultrasonic flow meter. In addition, since there is no device that disturbs the flow of a fluid in the pipe, no pressure loss occurs, a measurable flow rate range is wide, and accuracy is high.

In general, the speed of a sound wave in a flow direction of a fluid is higher than the speed of the sound wave in a direction opposite the flow direction of the fluid. Consequently, ultrasonic waves may be oscillated from a pair of ultrasonic transducers spaced apart from each other by a predetermined distance in the flow direction of the fluid in order to measure the propagation speed of the ultrasonic waves in the flow direction of the fluid and the propagation speed of the ultrasonic waves in the direction opposite the flow direction of the fluid, and the difference between the measured propagation speeds of the ultrasonic waves may be compared to each other in order to calculate the speed of the fluid. In particular, the sectional area of a pipe in which the fluid flows may be multiplied by the speed of the fluid in order to calculate the flow rate of the fluid.

When the flow speed of the fluid flowing in the pipe is high, the ultrasonic flow meter may accurately measure the flow rate of the fluid. When the flow speed of the fluid is low, however, an error in flow rate measurement occurs, since the difference between the propagation speed of the ultrasonic waves in the flow direction of the fluid and the propagation speed of the ultrasonic waves in the direction opposite the flow direction of the fluid is extremely small.

In order to solve this problem, an ultrasonic flow meter disclosed in Patent Document 1 is configured such that the diameter of a flow channel FC is gradually reduced toward the middle thereof, as shown in FIG. 13. When the flow speed of the fluid is increased, therefore, pressure loss occurs, whereby an error in flow rate measurement occurs. Therefore, there is a need to provide a method capable of solving this problem.

The above information disclosed in this Background section is provided only for enhancement of understanding of the background of the present disclosure and therefore it may contain information that does not form the prior art that is already known in this country to a person of ordinary skill in the art.

PRIOR ART DOCUMENTS

Patent Documents (Patent Document 1) EP 10174660 B1
(Patent Document 2) KR 10-2189806 B1

BRIEF SUMMARY

One or more aspects of the present disclosure is directed to provide an ultrasonic flow meter that substantially obviates one or more problems due to limitations and disadvantages of the related art.

An ultrasonic flow meter, according to an embodiment of the present disclosure, comprises a measurement tube, an ultrasonic sensor module, and a pair of reflectors, wherein the measurement tube is configured to allow fluid to flow therethrough and comprises a pair of sensor holes spaced apart from each other in a longitudinal direction on an outer surface thereof, the ultrasonic sensor module comprises a pair of ultrasonic transducers mounted in the sensor holes, the ultrasonic transducers being configured to send and receive ultrasonic waves, and the pair of reflectors are located in the measurement tube, and wherein the measurement tube further comprises a flow path sectional area reduction member comprising a plurality of plates arranged such that a plurality of branch flow paths are formed along the longitudinal direction around a central flow path in between the pair of reflectors.

In at least one embodiment of the present disclosure, both longitudinal ends of each of the plurality of plates are rounded.

In at least one embodiment of the present disclosure, the central flow path is formed by the plurality of plates facing each other with the central flow path located therebetween.

In at least one embodiment of the present disclosure, a width of the central flow path is smaller than or equal to a width of one of the reflectors.

In at least one embodiment of the present disclosure, the measurement tube comprises a first vertical wall and a second vertical wall, and the plurality of plates are protruded from the first and second vertical walls.

In at least one embodiment of the present disclosure, the plurality of plates are spaced from each other with a predetermined distance along the first or second vertical wall.

In at least one embodiment of the present disclosure, the measurement tube comprises a first half body and a second half body which is assembled to the first half body by welding or bonding.

In at least one embodiment of the present disclosure, the measurement tube provides a first flow path in which the flow path sectional area reduction member is located, a second flow path at one side of the first flow path, and a third flow path at the other side of the first flow path, a cross-sectional area of the first flow path being smaller than each cross-sectional area of the second and third flow paths.

In at least one embodiment of the present disclosure, the measurement tube comprises a central tube configured to provide a first flow path in which the plurality of plates are located, a first tube located at one side of the central tube, the first tube configured to provide a second flow path in which a first reflector is located and comprising a first sensor hole in flow-communication with the second flow path, and a second tube located at the other side of the central tube, the second tube configured to provide a third flow path in which a second reflector is located and comprising a second sensor hole in flow-communication with the third flow path.

In at least one embodiment of the present disclosure, the plurality of plates each extends radially in a curved shape from an inner surface of the measurement tube.

In at least one embodiment of the present disclosure, the central tube comprises at least one hook on an outer surface at each longitudinal end, and the first and second tubes each comprises a hook hole to which the at least one hook is engaged.

In at least one embodiment of the present disclosure, the hook hole comprises a through-cut at each end along the longitudinal direction.

In at least one embodiment of the present disclosure, the first and the second tubes each comprises a pressure-loss-reducing hole located opposite to the sensor hole.

In at least one embodiment of the present disclosure, a diameter of the pressure-loss-reducing hole is the same as a diameter of the sensor hole.

In at least one embodiment of the present disclosure, the pair of reflectors each comprises a reflecting portion, an embedded portion located at each side of the reflecting portion, and a connecting portion configured to connect the reflecting portion and the embedded portion.

In at least one embodiment of the present disclosure, the embedded portion comprises an edge having a curvature which is the same as a curvature of an inner circumference of the first or second tube.

In at least one embodiment of the present disclosure, a through hole is formed between the reflecting portion and the embedded portion.

In at least one embodiment of the present disclosure, the embedded portion is unified with the first or second tube by insert molding.

In at least one embodiment of the present disclosure, the plurality of plates each is configured to be thinner at a closer portion to the central flow path.

In at least one embodiment of the present disclosure, the plurality of plates each extends in a radial direction.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings.

DETAILED DESCRIPTION

Figure 1:
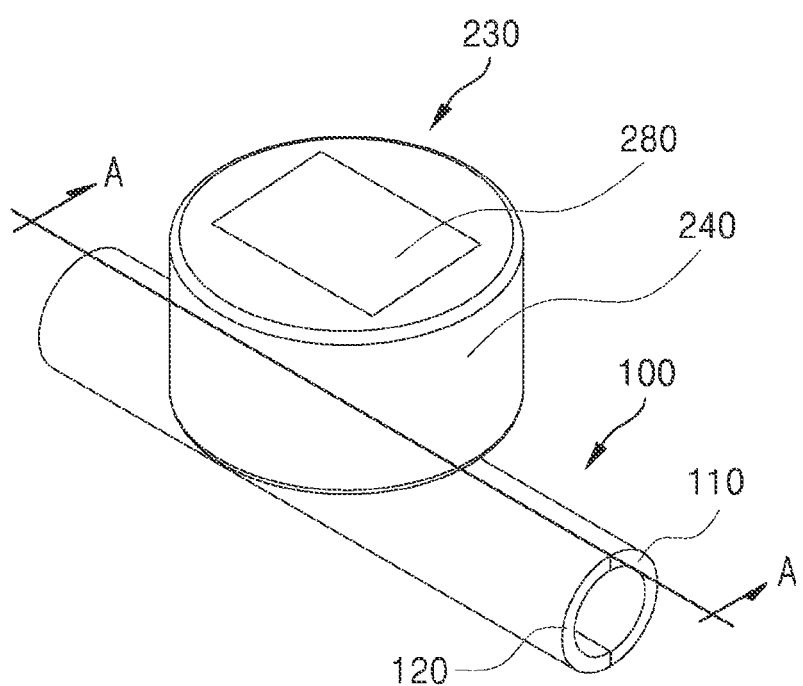
FIG. 1 is a view showing an ultrasonic flow meter according to a first embodiment of the present disclosure.

The present disclosure may be changed in various manners and may have various embodiments, wherein specific embodiments will be described with reference to the drawings. However, the present disclosure is not limited to the specific embodiments, and it should be understood that the present disclosure includes all modifications, equivalents, or substitutions included in the idea and technical scope of the present disclosure.

Although terms including ordinal numbers, such as "first" and "second," may be used herein to describe various components, these components should not be limited by these terms. These terms are only used to distinguish one component from another component.

The term "and/or" includes any and all combinations of one or more of the associated listed items. For example, "A and/or B" includes "A", "B", and "A and B".

It should be understood that, when a component is referred to as being "connected to" or "coupled to" another component, it may be directly connected to or coupled to another component or intervening components may be present. In contrast, it should be understood that, when a component is referred to as being "directly connected to" or "directly coupled to" another component, there are no intervening components present.

In the following description of the embodiments, it will be understood that, when an element, such as a layer (film), a region, a pattern, or a structure, is referred to as being "on" or "under" another element, such as a substrate, a layer (film), a region, a pad, or a pattern, it can be "directly" on or under another element or can be "indirectly" formed such that an intervening element is also present. Terms such as "on" or "under" are described on the basis of the drawings, and are used to show relative positions between components for the sake of convenience, rather than to define actual positions of the components. For example, "B above A" indicates merely that B is shown as being on A in the drawings, unless mentioned otherwise or unless A must be located above B due to attributes of A and B. Actually, B may be located under A, or B and A may be disposed side by side.

Also, in the drawings, the thickness or size of a layer (film), a region, a pattern, or a structure may be changed for convenience of description and clarity, and therefore the size thereof does not entirely reflect the actual size thereof.

The terms used in the present application are provided only to described specific embodiments, and do not limit the present disclosure. Singular forms are intended to include plural forms as well, unless the context clearly indicates otherwise. In the present application, it should be understood that the terms "includes," "has," etc. specify the presence of stated features, numbers, steps, operations, elements, components, or combinations thereof, but do not preclude the presence or addition of one or more other features, numbers, steps, operations, elements, components, or combinations thereof.

All terms, including technical and scientific terms, have the same meanings as those commonly understood by one of ordinary skill in the art to which this disclosure pertains, unless otherwise defined. Commonly used terms, such as those defined in typical dictionaries, should be interpreted as being consistent with the contextual meaning of the relevant art, and are not to be construed in an ideal or overly formal sense unless expressly defined to the contrary.

Hereinafter, embodiments will be described in detail with reference to the accompanying drawings, and the same or similar elements are denoted by the same reference numerals even though they are depicted in different drawings and redundant description thereof will be omitted.

Figure 2:
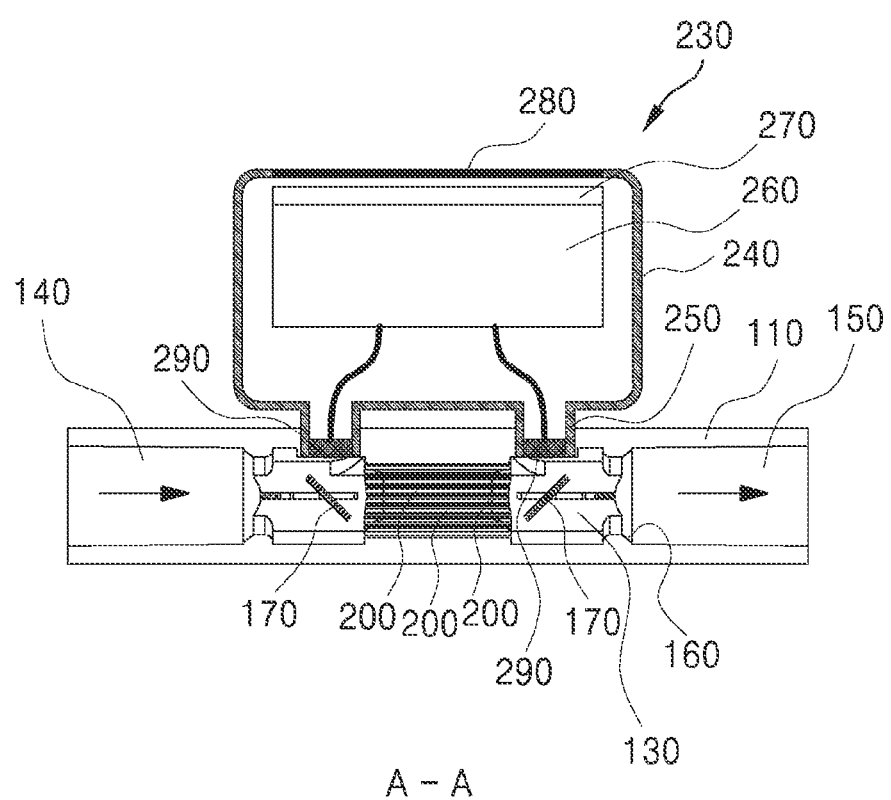
FIG. 2 is a sectional view taken along line A-A of FIG. 1.
Figure 3:
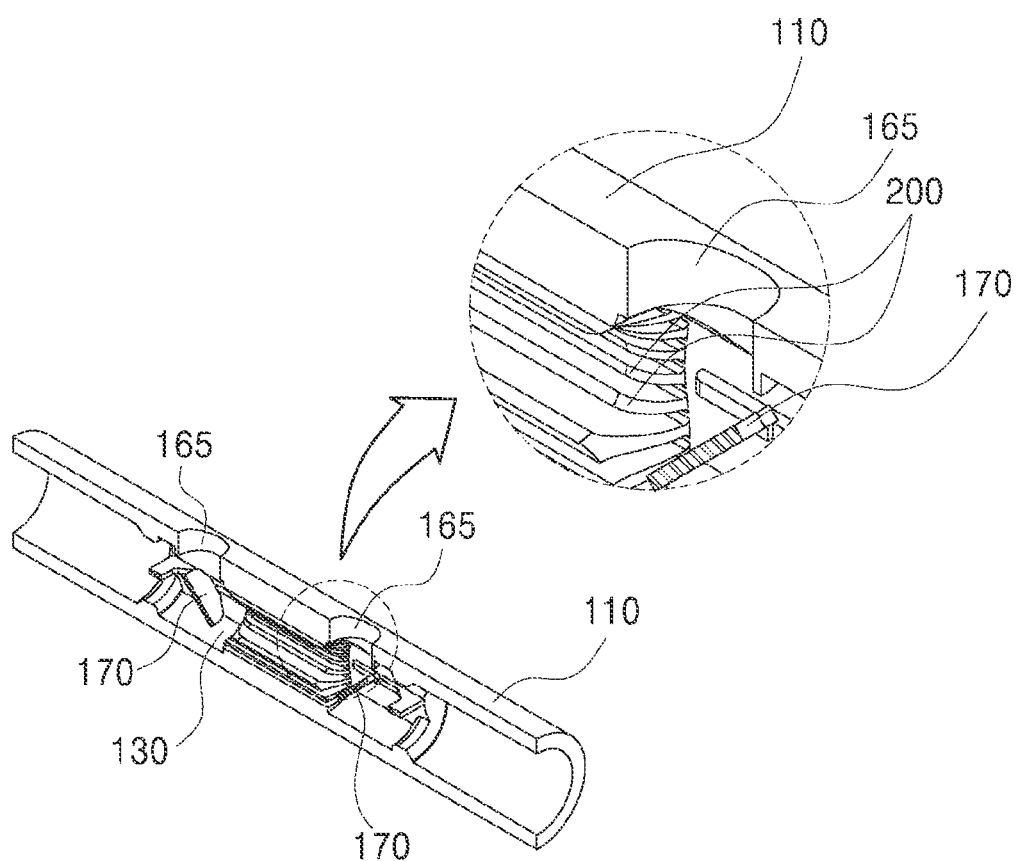
FIG. 3 is a view showing a first body of a measurement tube in the ultrasonic flow meter according to the first embodiment of the present disclosure.

FIG. 1 is a view showing an ultrasonic flow meter according to an embodiment of the present disclosure, FIG. 2 is a sectional view taken along line A-A of FIG. 1, and FIG. 3 is a view showing a first body of a measurement tube in the ultrasonic flow meter according to the embodiment of the present disclosure.

Figure 4:
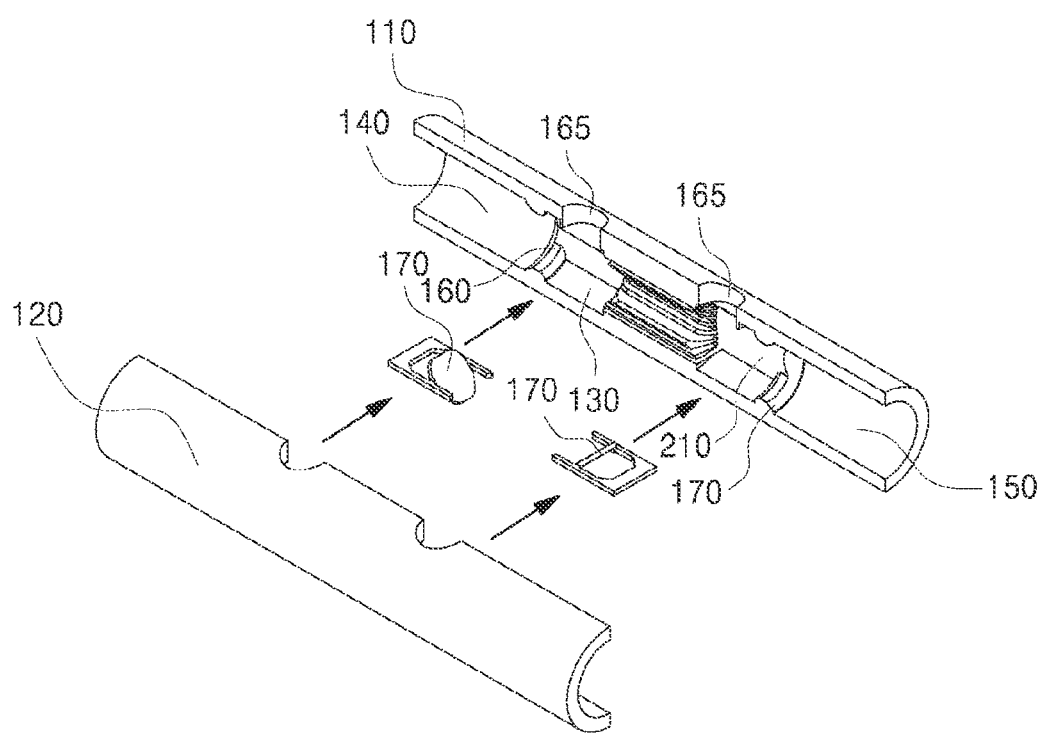
FIG. 4 is a view showing that the first body and a second body of the measurement tube are assembled by coupling in the ultrasonic flow meter according to the first embodiment of the present disclosure.
Figure 5:
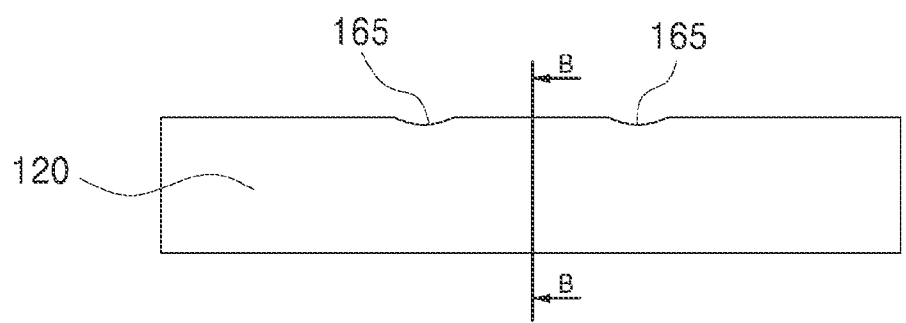
FIG. 5 is a side view showing the measurement tube of the ultrasonic flow meter according to the first embodiment of the present disclosure.
Figure 6:
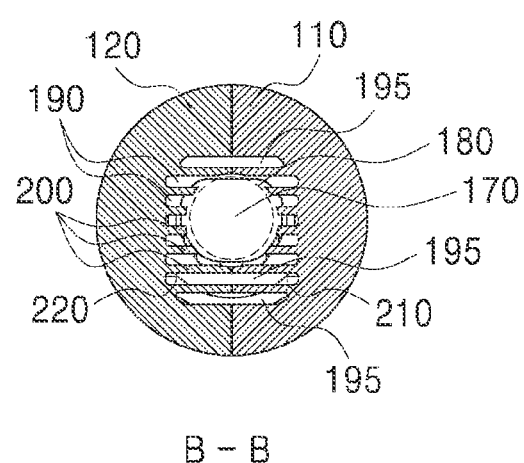
FIG. 6 is a sectional view taken along line B-B of FIG. 5.

FIG. 4 is a view showing that the first body and a second body of the measurement tube are assembled by coupling in the ultrasonic flow meter according to the embodiment of the present disclosure, FIG. 5 is a side view showing the measurement tube of the ultrasonic flow meter according to the embodiment of the present disclosure, and FIG. 6 is a sectional view taken along line B-B of FIG. 5.

The overall construction of the ultrasonic flow meter according to a first embodiment of the present disclosure will be described with reference to FIGS. 1 to 6.

The ultrasonic flow meter of the first embodiment includes a measurement tube 100, an ultrasonic sensor module 230, a housing 240, and a flow path sectional area reduction member.

The measurement tube 100 has a first flow path 130, in which a fluid flows, formed therein, and includes a pair of sensor holes 165 formed in an outer surface thereof in a state of being spaced apart from each other in a longitudinal direction so as to communicate with the first flow path 130.

Referring to FIG. 2, the measurement tube 100 includes a second flow path 140 connected to one side of the first flow path 130 and a third flow path 150 connected to the other side of the first flow path 130. Each of the second flow path 140 and the third flow path 150 has a larger flow path diameter than the first flow path 130, thus having a larger flow path sectional area than the first flow path 130.

An inclined portion 160 is formed between the first flow path 130 and the second flow path 140, which have different diameters, and between the first flow path 130 and the third flow path 150, which have different diameters.

The measurement tube 100 is manufactured by injection-molding a plastic material. As shown in FIG. 4, a first half body 110 and a second half body 120, each of which is half of the measurement tube 100, may be separately manufactured, and may be joined to each other by bonding or by thermal or vibration welding. At this time, a reflector 170 may be assembled therewith.

Depending on embodiments, the first body 110 and the second body 120 may be coupled to each other first, and the reflector 170 may be inserted through the second flow path 140 and the third flow path 150 so as to be coupled to the first flow path 130.

The flow path sectional area reduction member regularly reduces the sectional area of the first flow path 130 over at least a predetermined distance in an extension direction of the first flow path 130 between a pair of reflectors 170 in the measurement tube 100.

The flow path sectional area reduction member includes a central flow path 180 and a branch flow path 190.

As shown in FIG. 6, the central flow path 180 is located at a center of the flow path sectional area reduction member to allow ultrasonic waves reflected by the reflectors 170 to move therethrough. A plurality of branch flow paths 190 is formed around the central flow path 180 to divide the fluid flowing in the first flow path 130.

The branch flow paths 190 may be continuously formed over a predetermined distance in the extension direction of the first flow path 130. In this embodiment, as shown in FIG. 2, the predetermined distance is substantially less than the distance between the pair of reflectors 170.

The branch flow paths 190 are continuously formed in the extension direction of the first flow path 130, and are located between a plurality of plates 200 formed on an inner wall of the first flow path 130 so as to protrude.

The inner wall of the first flow path 130 includes a first vertical wall 210 formed at the first body 110 and a second vertical wall 220 formed at the second body 120, and the plurality of plates 200 protrudes from the first vertical wall 210 and the second vertical wall 220 in a horizontal direction so as to face each other. In this embodiment, the shape of each plate 200 is set such that the plate can be easily injection-molded; however, the present disclosure is not limited thereto.

Tips may be connected to some of the plurality of plates 200 protruding from the first vertical wall 210 and the second vertical wall 220. As a result, a branch hole 195 isolated from the central flow path 180 may be formed in an upper part and a lower part of the central flow path 180. However, the present disclosure is not limited thereto. Preferably, as shown in FIG. 6, a plurality of branch flow paths 190 is formed around the central flow path 180 so as to communicate with the central flow path 180.

Since the plurality of plates 200 protrudes from the first vertical wall 210 and the second vertical wall 220 in the horizontal direction, it is advantageous that the first body 110 or the second body 120 is easily separated from a mold at the time of injection molding.

When formed on the first vertical wall 210 or the second vertical wall 220, the plurality of plates 200 may be spaced apart from each other by a set distance from an upper side to a lower side. Since the plurality of plates 200 is formed so as to be spaced apart from each other, the branch flow paths 190 may be formed between the plates 200.

The plurality of plates 200 comprises upper plates and lower plates with respect to the center of the central flow path 180, the lower plate, among the upper plates, extending shorter from the first vertical wall 210 or the second vertical wall 220, and the lower plate, among the lower plates, extending longer from the first vertical wall 210 or the second vertical wall 220. The central flow path 180 is formed by the varying extending lengths of the plates 200.

In addition, as shown in FIG. 3, both ends of each of the plurality of plates 200 in a longitudinal direction may be rounded. Since both ends of the plate 200 are rounded, it is possible to achieve an effect in that the flow of the fluid introduced into the central flow path 180 is good.

As shown in FIG. 6, the central flow path 180 is formed between the plurality of plates 200 formed in the first flow path 130 so as to face each other, and the width of the central flow path 180 may be equal to or slightly less than the width of the reflector.

The measurement tube 100 has the above structure. Consequently, when a fluid is introduced into the second flow path 140 and is then introduced into the first flow path 130, the flow path sectional area of which is less than the flow path sectional area of the second flow path 140, the flow speed of the fluid is primarily increased, and, since the flow path sectional area of the first flow path 130 is less than the sectional area of the first flow path 130 due to the flow path sectional area reduction member formed in the first flow path 130, the flow speed of the fluid is further increased, whereby it is possible to achieve an effect in that an error in flow rate measurement caused due to a low flow speed of the fluid is reduced. In addition, the fluid may flow in the flow path between the reflectors 170 in the state in which the flow path is full of the fluid even when the flow rate of the fluid is low, and therefore measurement accuracy when the flow rate of the fluid is low is improved.

Referring to FIG. 2, the ultrasonic sensor module 230 includes a pair of ultrasonic transducers 290 installed in the sensor holes 165, the ultrasonic transducers 290 being configured to send and receive ultrasonic waves.

The housing 240 is provided at a lower part thereof with a pair of ultrasonic sensor module installation portions 250 having the same shape and size as the pair of sensor holes 165 so as to be coupled thereto, and has a receiving space configured to receive a computation unit 260 and a display 270. The housing 240 is provided at an upper surface thereof with a transparent cover 280. As shown in FIG. 1, a portion of the cover may be formed at the housing 240, or the cover may be formed so as to cover the entire upper part of the housing 240.

The ultrasonic transducers 290 are configured to send ultrasonic waves in a downward direction and to receive the ultrasonic waves in an upward direction in order to transmit a signal. Preferably, the ultrasonic transducers 290 are water-tightly coupled to the ultrasonic sensor module installation portions 250 via packing members.

Preferably, each of the housing 240 and the measurement tube 100 is made of a polymeric material, and the housing 240 and the measurement tube 100 may be integrally manufactured.

The ultrasonic transducer 290 is formed as a piezoelectric ceramic structure in which an oscillation portion configured to convert an electrical signal into ultrasonic waves and a reception portion configured to receive the ultrasonic waves and to convert the received ultrasonic waves into an electrical signal are integrally combined. The structure of the ultrasonic transducer 290 is already known, and therefore a detailed description thereof will be omitted for simplicity of description.

The ultrasonic transducer 290 is connected to the computation unit 260 in a wired manner to provide an ultrasonic reception signal for flow speed and flow rate calculation.

The pair of reflectors 170 is located in the first flow path 130 of the measurement tube 100, and is disposed so as to face each other in an inclined state under the ultrasonic sensor module. The reflector 170 is made of a metal material. Since the ultrasonic flow meter according to the present disclosure is mainly used to measure the usage amount of water for water supply, the reflector may be made of a material that is not eroded by water, such as stainless steel or brass.

The computation unit 260 may be powered by a battery. Depending on circumstances, the computation unit 260 may be powered by a separate power supply.

An ultrasonic flow meter according to a second embodiment of the present disclosure is detailed through FIG. 7 to FIG. 13.

The ultrasonic flow meter of the second embodiment comprise a measurement tube 1100, a flow path sectional area reduction member, and an ultrasonic sensor module (which is the same as the one of the first embodiment).

The measurement tube 1100 may be configured to allow the fluid to flow therethrough and comprise a pair of sensor holes 1150, 1180 which are spaced apart from each other on an outer surface of the measurement tube 1100 in a longitudinal direction.

Though it is not shown in FIGs, the measurement tube 1100 may be mounted in a pipe for supplying faucet water to a household. The outer diameter of the measurement tube 1100 may be smaller than the inner diameter of the pipe.

Figure 7:
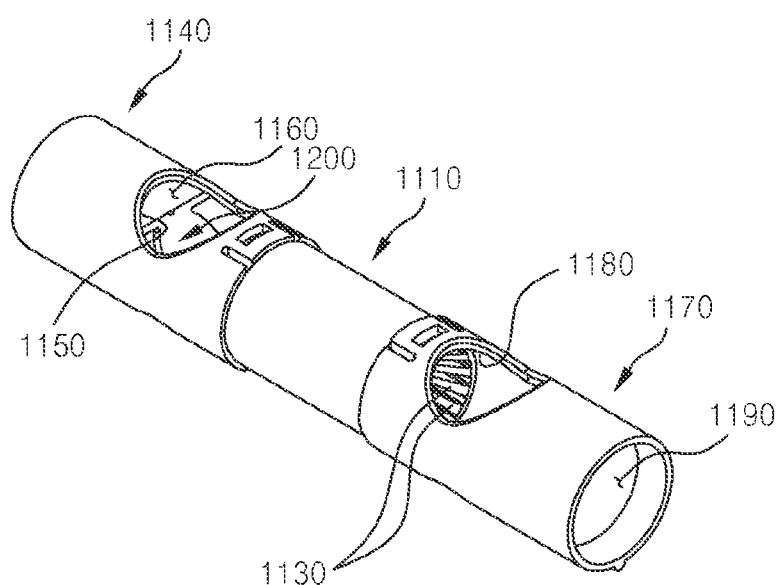
FIG. 7 shows an ultrasonic flow meter according to a second embodiment of the present disclosure.
Figure 8:
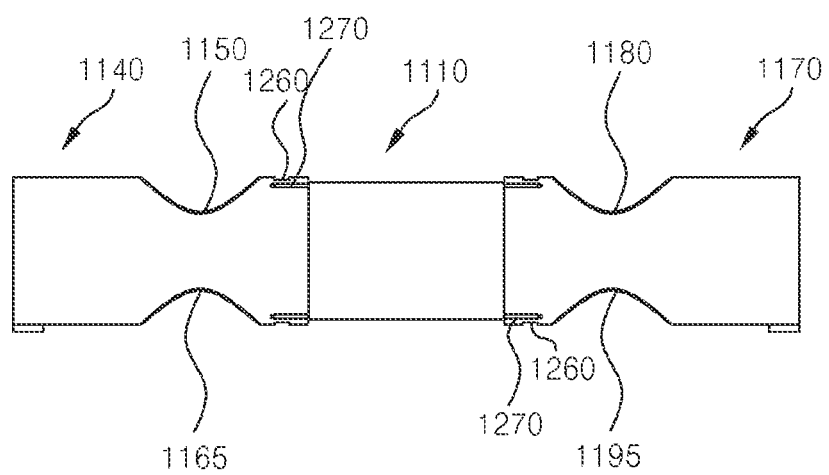
FIG. 8 is a sectional view taken along line A-A of FIG. 7.
Figure 9:
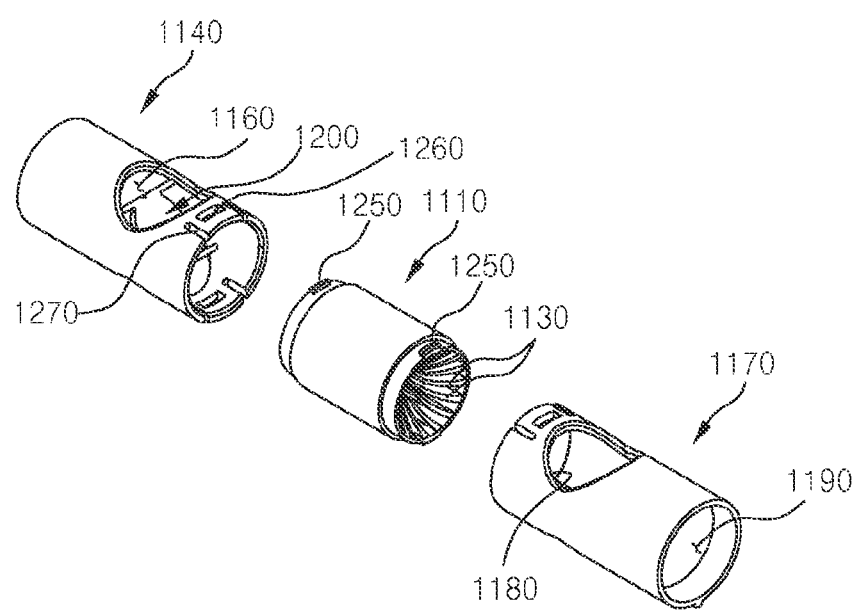
FIG. 9 shows the first, the central and the second tubes of the ultrasonic flow meter of FIG. 7 in a disassembled state.

As shown in FIG. 7, the measurement tube 1100 may comprises a central tube 1110, a first tube 1140, and a second tube 1170.

Figure 10:
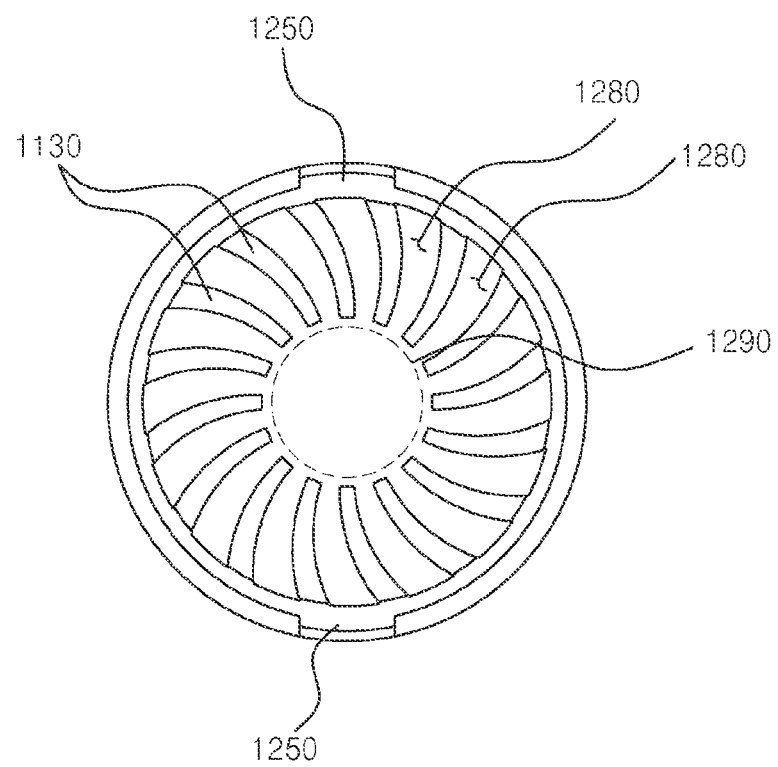
FIG. 10 shows the central tube of the ultrasonic flow meter of FIG. 7.
Figure 11:
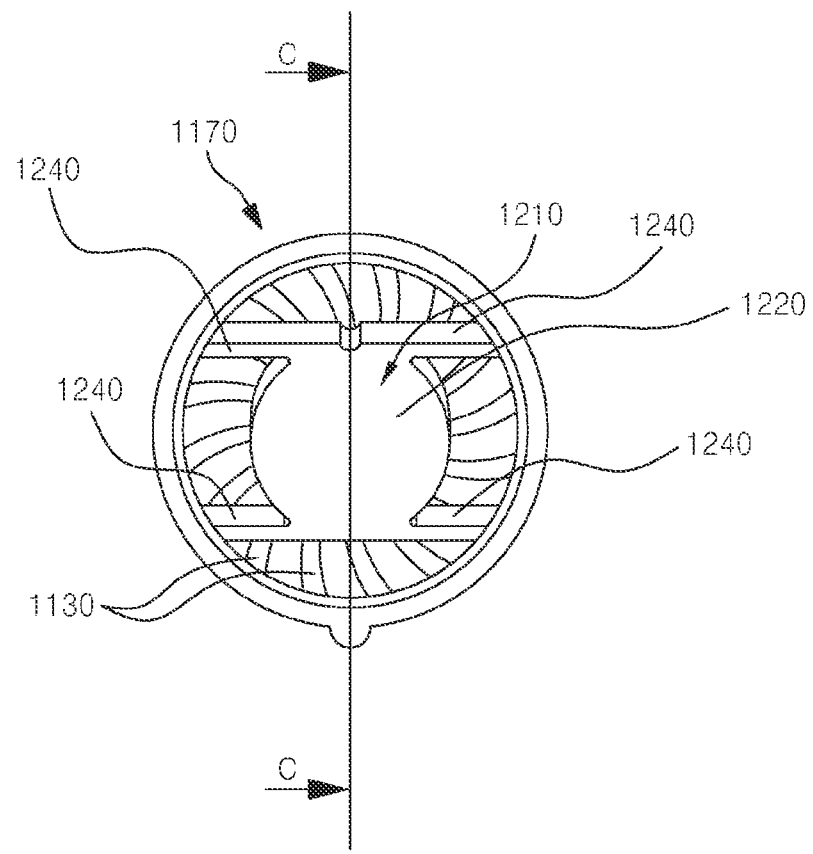
FIG. 11 shows the second tube of the ultrasonic flow meter of FIG. 7.

In the central tube 1110, as shown in FIG. 10, is formed a first flow path 1120, and a plurality of plates 1130 are located in the first flow path 1120. The central tube 1110 comprises a hook 1250 at each end in the longitudinal direction.

The first tube 1140 provides a second flow path 1160 at one side of the central tube 1110, and comprises a first sensor hole 1150 which is in flow-communication with the second flow path 1160. In the second flow path 1160 is located a first reflector 1200.

The second tube 1170 provides a third flow path 1190 at the other side of the central tube 1110, and comprises a second sensor hole 1180 which is in flow-communication with the third flow path 1190. In the third flow path 1190 is located a second reflector 1210.

The first tube 1140 and the second tube 1170 each comprises a hook hole 1260 which is engaged to the hook 1250.

The hook hole 1260 comprise a through-cut 1270 at each end along the longitudinal direction.

The first tube 1140 comprises a first pressure-loss-reducing hole 1165 located opposite to the first sensor hole 1150, and the second tube 1170 comprises a second pressure-loss-reducing hole 1195 located opposite to the second sensor hole 1180.

Pressure loss of the fluid flowing through the first flow path 1120, the second flow path 1160 and the third flow path 1190 due to the reflectors is reduced by the first pressure-loss-reducing hole 1165 and the second pressure-loss-reducing hole 1195.

The diameters of the first pressure-loss-reducing hole 1165 and the second pressure-loss-reducing hole 1195 may be the same as the diameter of the first sensor hole 1150 and the second sensor hole 1180, respectively.

The flow path sectional area reduction member may reduce the cross-sectional area of the first flow path 1120 for a predetermined longitudinal distance section in between the pair of reflectors.

The flow path sectional area reduction member comprises a plurality of plates 1130 which are arranged in between the reflectors such that a plurality of branch flow paths 1280 are formed in the longitudinal direction around a central flow path 1290.

The plurality of plates 1130 each extends in the central tube 1110 in a radial direction as shown in FIG. 10.

The plurality of plates 1130 each is configured to be thinner at a closer portion to the central flow path 1290.

Also, as shown in FIG. 10, the plurality of plates 1130 each extends radially in a curved shape from an inner surface of the measurement tube 1100.

The central flow path 1290, as shown in FIG. 10, allows ultrasonic waves reflected from the reflectors to pass through. The branch flow paths 1280 allow branch flow of the fluid flowing through the first flow path 1120.

The branch flow paths 1280 may be formed continuously along a predetermined distance in a flow direction of the first flow path 1120 in the central tube 1110. The predetermined distance may be substantially smaller than the distance between the first sensor hole 1150 and the second sensor hole 1180.

The branch flow paths 1280 may be provided in between the plurality of plates 1130 which protrude from an inner surface of the central tube 1110 and extend continuously along the flow direction of the first flow path 1120.

Figure 12:
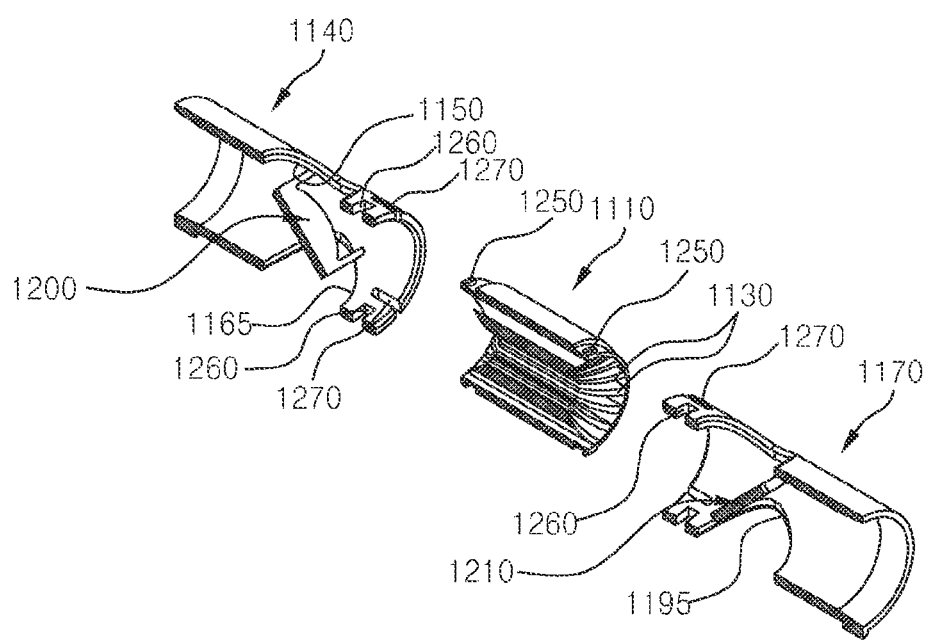
FIG. 12 shows a sectional view of FIG. 9.

Also, the plurality of plates 1130, as shown in FIG. 12, each is rounded at both ends in the longitudinal direction. Because of the rounded portions, the fluid flowing into the first flow path 1120 is smoothly guided to the central flow path 1290.

The central flow path 1290, as shown 10 FIG. 10, may be formed by the plurality of plates 1130 facing each other, and a width of the central flow path 1290 may be slightly smaller than or equal to a width of the reflector.

The pair of reflectors comprise a first reflector 1200 and a second reflector 1210, and are located opposite to each other in the first flow path 1120 of the measurement tube 1100 with a slanted angle.

Figure 13:
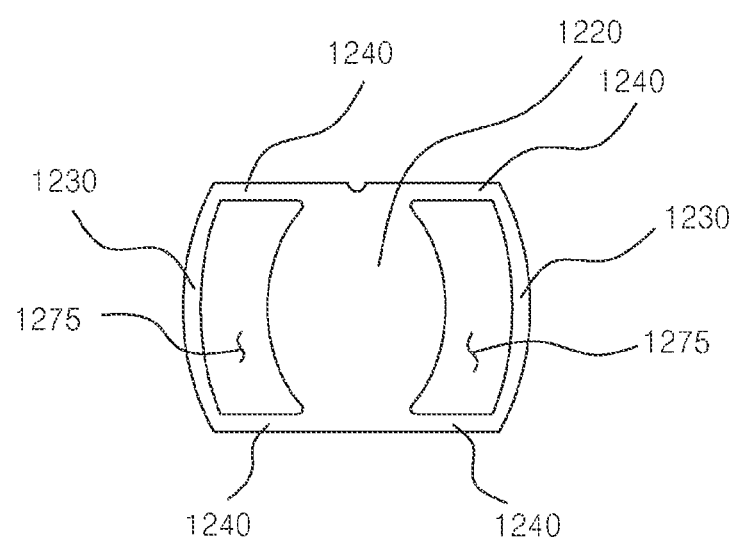
FIG. 13 shows the reflectors of the ultrasonic flow meter of FIG. 7.
Figure 14:
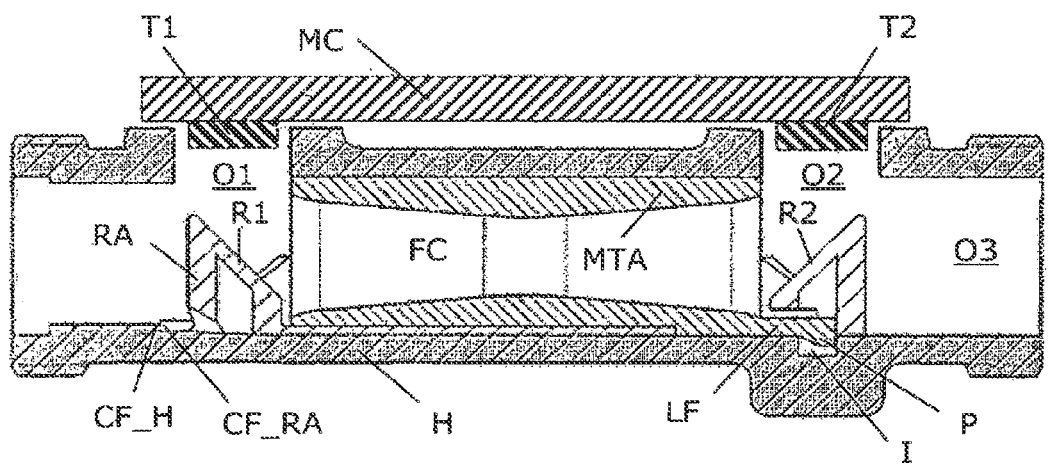
FIG. 14 shows a conventional flow meter.

The first reflector 1200 and the second reflector 1210, as shown in FIG. 13, each comprises a reflecting portion 1220, an embedded portion 1230, and a connecting portion 1240. The reflecting portion 1220 may be made of metal, i.e., corrosion-resistant metal such as stainless steel, copper, etc.

The embedded portion 1230 is formed at each side of the reflecting portion 1220.

A plurality of the connecting portions 1240 connect upper parts of the reflecting portion 1220 and upper parts of the both embedded portions 1230. Through holes 1275 are provided at both sides of the reflecting portion 1220 in between connecting portions 1240.

The embedded portion 1230, as shown in FIG. 13, has a curved portion the curvature of which is identical in a state of being mounted in the first tube 1140 and the second tube 1170 with a predetermined slant angle to a curvature of a circumference of a slanted cross-section of the first tube 1140 and the second tube 1170, and thus the embedded portion 1230 can be embedded by insert injection molding into walls of the first tube 1140 and the second tube 1170 without being exposed outside.

The ultrasonic sensor module and the computation unit of the second embodiment are the same as those of the first embodiment, and thus a detailed description of them is omitted.

A process in which the ultrasonic flow meters of the first or second embodiments measure a flow speed of the fluid through the pair of ultrasonic transducers 290 is already known from Patent Document 2, and therefore a detailed description thereof will be omitted for simplicity of description.

According to an exemplary embodiment of the present disclosure, the computation unit may include a processor (e.g., microprocessor, circuitry, logic circuits, etc.) and an associated non-transitory memory storing software instructions which, when executed by the processor, provides functionalities relevant to measuring and storing flow speeds, i.e., computation of a flow speed, storing the flow speed in a memory, etc. Herein, the memory and the processor may be implemented as separate semiconductor circuits. Alternatively, the memory and the processor may be implemented as a single integrated semiconductor circuit. The processor may embody one or more processor(s).

As is apparent from the above description, the present disclosure has an effect in that, when a fluid passes through a flow path between reflectors, the fluid may flow in the state in which the flow path is full of the fluid even though the flow rate of the fluid is low, and the flow speed of the fluid is also increased, whereby it is possible to increase sensing accuracy.

Effects obtainable from the present disclosure are not limited by the above mentioned effects, and other unmentioned effects can be clearly understood from the above description by those having ordinary skill in the technical field to which the present disclosure pertains.

Although embodiments have been described above, the embodiments are merely illustrations and do not limit the present disclosure, and those skilled in the art will appreciate that various modifications and applications are possible without departing from the intrinsic features of the disclosure. For example, concrete constituent elements of the embodiments may be modified. In addition, it is to be understood that differences relevant to the modifications and the applications fall within the scope of the present disclosure defined in the appended claims.

What is claimed is:

1. An ultrasonic flow meter comprising:
   a measurement tube configured to allow fluid to flow therethrough, the measurement tube comprising a pair of sensor holes spaced apart from each other in a longitudinal direction on an outer surface thereof;
   an ultrasonic sensor module comprising a pair of ultrasonic transducers installed in the sensor holes, the ultrasonic transducers being configured to send and receive ultrasonic waves; and
   a pair of reflectors located in the measurement tube,
   wherein the measurement tube comprises a flow path sectional area reduction member comprising a plurality of plates arranged such that a plurality of branch flow paths are formed between the plurality of plates along the longitudinal direction around a central flow path in between the pair of reflectors, and
   wherein the plurality of plates extend towards the central flow path.

2. The ultrasonic flow meter according to claim 1, wherein both longitudinal ends of each of the plurality of plates are rounded.

3. The ultrasonic flow meter according to claim 1, wherein the central flow path is formed by the plurality of plates facing each other with the central flow path located therebetween.

4. The ultrasonic flow meter according to claim 3, wherein a width of the central flow path is smaller than or equal to a width of one of the reflectors.

5. The ultrasonic flow meter according to claim 1, wherein the measurement tube comprises a first vertical wall and a second vertical wall, and the plurality of plates are protruded from the first and second vertical walls.

6. The ultrasonic flow meter according to claim 5, wherein the plurality of plates are spaced from each other with a predetermined distance along the first or second vertical wall.

7. The ultrasonic flow meter according to claim 1, wherein the measurement tube comprises a first half body and a second half body which is assembled to the first half body by welding or bonding.

8. The ultrasonic flow meter according to claim 1, wherein the measurement tube provides a first flow path in which the flow path sectional area reduction member is located, a second flow path at one side of the first flow path, and a third flow path at the other side of the first flow path, a cross-sectional area of the first flow path being smaller than each cross-sectional area of the second and third flow paths.

9. The ultrasonic flow meter according to claim 1, wherein the measurement tube comprises:
a central tube configured to provide a first flow path in which the plurality of plates are located;
a first tube located at one side of the central tube, the first tube configured to provide a second flow path in which a first reflector is located and comprising a first sensor hole in flow-communication with the second flow path, and
a second tube located at the other side of the central tube, the second tube configured to provide a third flow path in which a second reflector is located and comprising a second sensor hole in flow-communication with the third flow path.

10. The ultrasonic flow meter according to claim 9, wherein the central tube comprises at least one hook on an outer surface at each longitudinal end, and the first and second tubes each comprises a hook hole to which the at least one hook is engaged.

11. The ultrasonic flow meter according to claim 10, wherein the hook hole comprises a through-cut at each end along the longitudinal direction.

12. The ultrasonic flow meter according to claim 9, wherein the first and the second tubes each comprises a pressure-loss-reducing hole located opposite to the sensor hole.

13. The ultrasonic flow meter according to claim 12, wherein a diameter of the pressure-loss-reducing hole is the same as a diameter of the sensor hole.

14. The ultrasonic flow meter according to claim 1, wherein the plurality of plates each extends radially in a curved shape from an inner surface of the measurement tube.

15. The ultrasonic flow meter according to claim 1, wherein the pair of reflectors each comprises:
a reflecting portion;
an embedded portion located at each side of the reflecting portion; and
a connecting portion configured to connect the reflecting portion and the embedded portion.

16. The ultrasonic flow meter according to claim 15, wherein the embedded portion comprises an edge having a curvature which is the same as a curvature of an inner circumference of the first or second tube.

17. The ultrasonic flow meter according to claim 15, wherein a through hole is formed between the reflecting portion and the embedded portion.

18. The ultrasonic flow meter according to claim 15, wherein the embedded portion is unified with the first or second tube by insert molding.

19. The ultrasonic flow meter according to claim 1, wherein the plurality of plates each is configured to be thinner at a closer portion to the central flow path.

20. The ultrasonic flow meter according to claim 1, wherein the plurality of plates each extends in a radial direction.

* * * * *